UNITED STATES PATENT OFFICE.

THOMAS S. GREENE, OF WALNUT GROVE, ALABAMA.

CATARRH REMEDY.

SPECIFICATION forming part of Letters Patent No. 378,504, dated February 28, 1888.

Application filed November 10, 1887. Serial No. 254,823. (No specimens.)

*To all whom it may concern:*

Be it known that I, THOMAS S. GREENE, a citizen of the United States, residing at Walnut Grove, in the county of Etowah and State of Alabama, have invented a new and useful Improvement in Catarrh Remedies, of which the following is a specification.

My compound consists of the following ingredients, combined in the proportions stated: bear's-foot root, (*Helleborus fœtidus*,) one-half pound; queen of meadow, (*Eupatorium purpureum*,) one-half pound; red pepper, (*Capsicum*,) one-half ounce; water, one quart; lard, (*Adipis*,) one pint; oil-spike, one ounce; oil-turpentine, (*Terebinthinus*,) one ounce; gum-camphor, one ounce.

My medicine is to be used in the treatment of nasal catarrh, and the above-named substances are combined and used in the manner hereinafter described.

The bear's-foot root, queen of the meadow, red pepper, and water are combined and boiled down to one pint, after which the lard is added and the resulting mixture allowed to simmer over a slow fire until all the water is dried out. The oil-spike, oil-turpentine, and gum-camphor are now added to the above and the compound is ready for use. It is applied to the nasal organs with a camel's-hair brush or a feather.

Bear's-foot root is a common herb, and its properties are of the alkaline nature. It is employed in various diseases to loosen the mucous secretions and allow them to be eliminated by the natural action of the organs.

The queen of the meadow, otherwise known as "meadow-sweet" and bearing the botanical name *Eupatorium purpureum*, is slightly astringent in its character.

The pepper is well known, and is an acrid pungent irritant. It is used as a local irritant to excite the membranes and mucous glands to a lively action, designed to aid in throwing off unhealthful secretions and bring about a normal action of the parts.

The lard possesses cooling properties designed to reduce local fever and irritation and enable the membranes to heal.

The oil-spike, oil-turpentine, and gum-camphor are designed to promote healthy secretion and granulation, and also aid in the healing of the ulcerated membranes.

Having described, I claim—

The herein-described composition to be used in the treatment of nasal catarrh, comprising bear's-foot root, queen of the meadow, red pepper, water, lard, oil-spike, oil-turpentine, and gum-camphor, in substantially the proportions specified.

In testimony that I claim the foregoing as my own I have hereto affixed my signature in presence of two witnesses.

THOMAS S. GREENE.

Witnesses:
W. R. MOODY,
JAMES T. BROOKS.